United States Patent [19]

Nishimura

[11] Patent Number: 5,031,744
[45] Date of Patent: Jul. 16, 1991

[54] ELECTROMAGNETICALLY CONTROLLED SPRING CLUTCH MECHANISM

[75] Inventor: Kozo Nishimura, Akashi, Japan
[73] Assignee: Mita Industrial Co., Ltd., Japan
[21] Appl. No.: 593,642
[22] Filed: Oct. 5, 1990

[30] Foreign Application Priority Data

Oct. 13, 1989 [JP] Japan .................................. 1-265068

[51] Int. Cl.⁵ .............................................. F16D 27/10
[52] U.S. Cl. ................................ 192/81 C; 192/84 B; 192/84 T
[58] Field of Search ................. 192/81 C, 41 S, 84 C, 192/12 B, 84 T

[56] References Cited

U.S. PATENT DOCUMENTS

| | | | |
|---|---|---|---|
| 2,523,772 | 9/1950 | McGibbon et al. | 192/81 C |
| 3,934,690 | 1/1976 | Janning | 192/84 T |
| 4,321,992 | 3/1982 | Gallo | 192/81 C |
| 4,502,578 | 3/1985 | Koyama | 192/81 C X |
| 4,570,768 | 2/1986 | Nishimura | 192/81 C X |
| 4,793,453 | 12/1988 | Nishimura | 192/81 C X |
| 4,825,988 | 5/1989 | Nishimura | 192/81 C X |
| 4,848,545 | 7/1989 | Nishimura | 192/81 C X |
| 4,913,274 | 4/1990 | Nishimura | 192/84 T |

FOREIGN PATENT DOCUMENTS

| | | | |
|---|---|---|---|
| 202030 | 11/1986 | European Pat. Off. | 192/84 T |
| 175633 | 10/1984 | Japan | 192/84 T |

Primary Examiner—Allan D. Herrmann
Assistant Examiner—Andrea Pitts
Attorney, Agent, or Firm—Beveridge, DeGrandi & Weilacher

[57] ABSTRACT

An electromagnetically controlled spring clutch mechanism includes a rotating output member, a rotating input member, a coil spring fitted astride the outer peripheral portions of these two members, an armature assembly disposed on the outer peripheral portion of the coil spring, and an electromagnetic coil assembly. When the electromagnetic coil is deenergized, the coil spring contracts in a tightening direction so that the output and input members are drivingly coupled together. When the electromagnetic coil is energized, rotation of the armature assembly is hampered, and the coil spring expands so that the output and input members are decoupled.

6 Claims, 2 Drawing Sheets

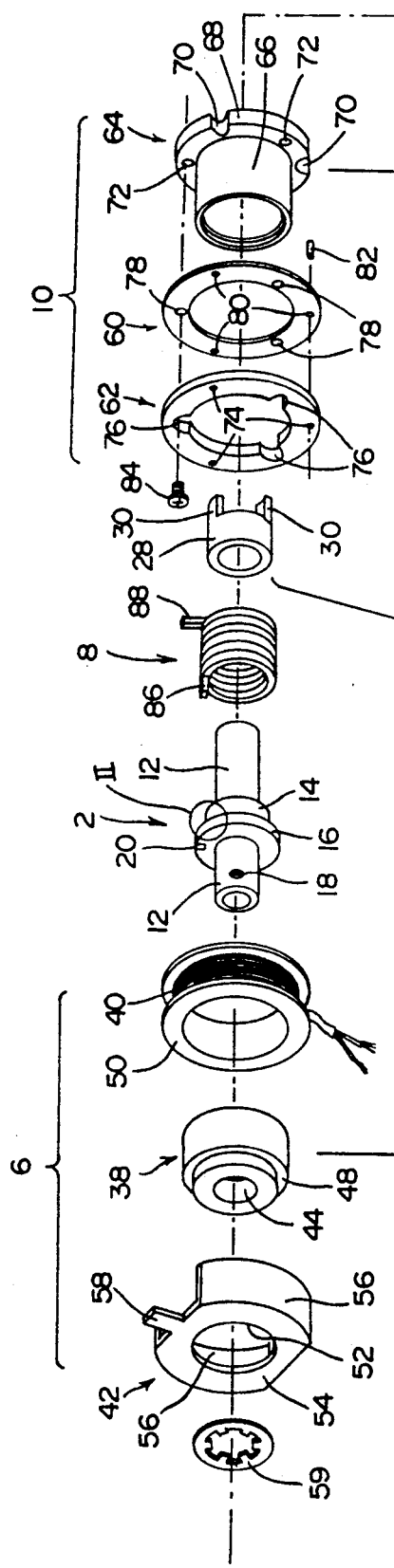
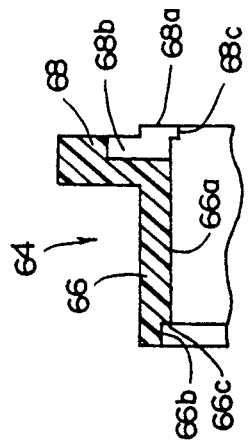
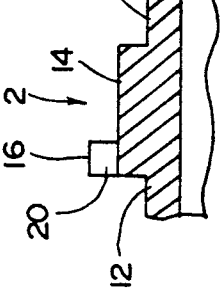

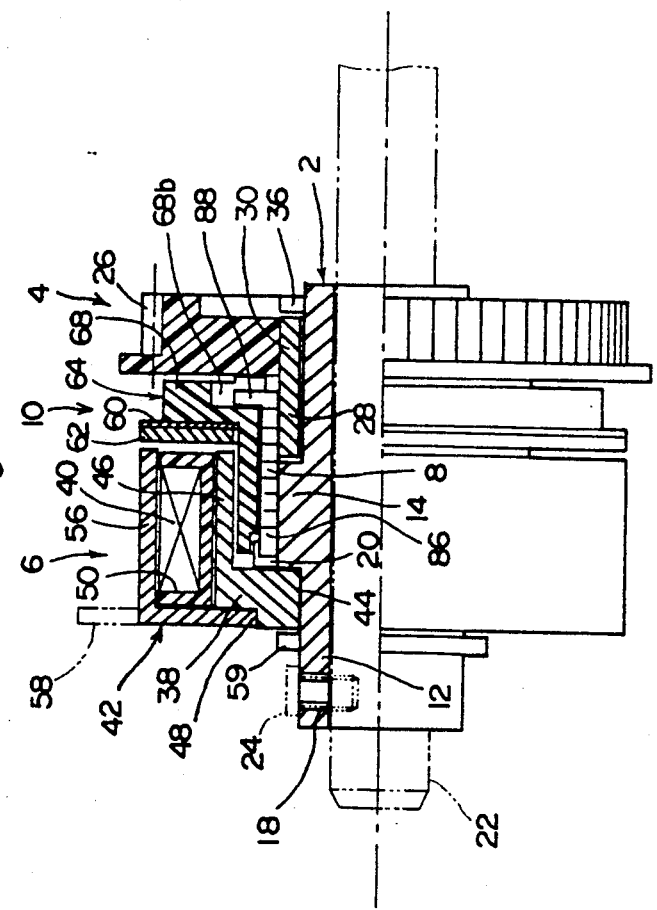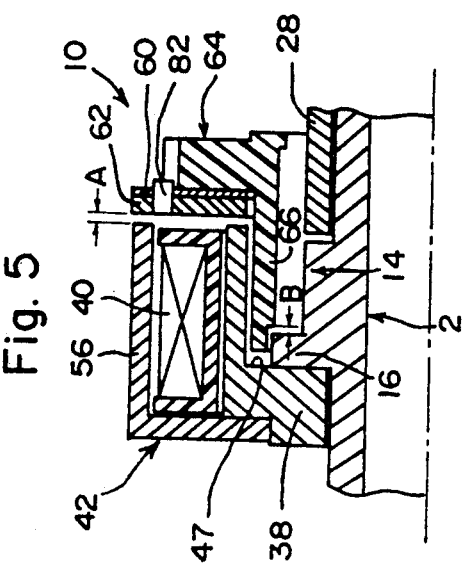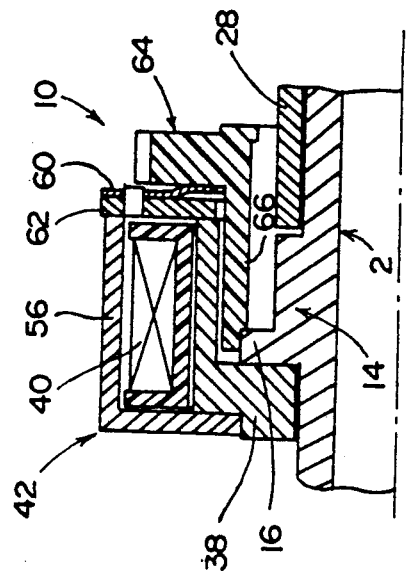

ELECTROMAGNETICALLY CONTROLLED SPRING CLUTCH MECHANISM

FIELD OF THE INVENTION

The present invention relates to an electromagnetically controlled spring clutch mechanism of the type in which when an electromagnetic coil is deenergized, a rotating input member and a rotating output member are coupled together, and when the electromagnetic coil is energized the coupling is released.

DESCRIPTION OF THE PRIOR ART

Japanese Patent Laid-Open Patent No. 224732/1987 discloses an electromagnetically controlled spring clutch mechanism of the aforesaid type. This electromagnetically controlled spring clutch comprises an input rotating element rotatably mounted on an axle member, an armature movably fitted to the axle member so as to move in the axial direction, a rotating member rotatably mounted on the axle member being opposed to one surface side of the armature, a spring that pushes the armature in a direction to approach the rotating member, an electromagnetic means that magnetically attracts the armature in a direction to separate away from the rotating member against the force of the spring, and a coil spring of which the one end is coupled to an input rotating element and of which the other end is coupled to the rotating member.

When the electromagnetic means is deenergized, one surface of the armature is pressed onto the opposed surface of the rotating member due to the action of the spring, the coil spring is contracted by the rotation hampering force exerted on the rotating member, and the rotational driving force of the input rotating element is transmitted to the axle member via the coil spring.

When the electromagnetic means is energized, the armature is separated away from the rotating member being attracted by the electromagnetic means, and the rotational driving force of the input rotating element is not transmitted any more.

The above-mentioned conventional electromagnetically controlled spring clutch mechanism has the following problems that must be solved.

(1) When the rotational driving force of the input rotating element is transmitted to the axle member, the rotation hampering force is exerted on the rotating member, and during this period, one surface of the armature is pressed onto the opposed surface of the rotating member due to the action of the spring. In order to obtain a sufficiently large rotation hampering force, a friction member must be provided on a surface of the rotating member opposed to the armature.

This means that when the driving force is needed, a force (dragging torque) that blocks the rotation is produced, resulting in the loss of driving force. Furthermore, the friction portion exhibits decreased durability since it is subject to wear, and the life is shortened.

(2) The electromagnetic means, armature, rotating member, coil spring, and input rotating element are simply arranged in the axial direction, requiring a large space as a whole in the axial direction, which is far from a compact arrangement.

SUMMARY OF THE INVENTION

The principal object of the present invention therefore is to provide an improved electromagnetically controlled spring clutch mechanism which develops no loss in the driving force, which exhibits excellent durability, and which is compact in size.

To achieve the above-mentioned principal object according to the present invention, there is provided an electromagnetically controlled spring clutch mechanism comprising a rotating output member having an output boss;

a rotating input member having an input boss which is rotatably supported by the rotating output member spaced thereto in the axial direction;

an electromagnetic coil assembly including an electromagnetic coil;

a coil spring which is fitted astride the outer peripheral portions of both the output boss and the input boss; and an armature assembly disposed along the outer peripheral portion of the coil spring;

wherein the armature assembly comprises an armature and a supporting member that are coupled together via a spring member, one end of the coil spring is engaged with the output boss, and its other end at the supporting member, and when the electromagnetic coil is deenergized, the coil spring is contracted in a tightening direction by the rotation of the input boss of the rotating input member, whereby the output boss and the input boss are drivingly coupled together and when the electromagnetic coil is energized, the armature is magnetically attracted to the electromagnetic coil assembly, so that the rotation of the armature assembly is blocked, and the contraction of the coil spring is released, and that the drivingly-coupling of the output boss and the input boss is released.

Other objects and features of the present invention will become obvious from the following detailed description of the specification with reference to and in conjunction with the accompanying drawings.

BRIEF DESCRIPTION OF THE DRAWINGS

FIG. 1 is an exploded perspective view showing an embodiment of the electromagnetically controlled spring clutch mechanism constructed according to the present invention;

FIG. 2 is a sectional view illustrating a portion II of FIG. 1 on an enlarged scale;

FIG. 3 is a sectional view showing a major portion of a supporting member of FIG. 1 on an enlarged scale;

FIG. 4 is a sectional view showing a major portion of the electromagnetically controlled spring clutch mechanism of FIG. 1;

FIG. 5 is a sectional view of FIG. 4 excluding some constituent parts; and

FIG. 6 is a sectional view useful in illustrating the operation of the spring clutch mechanism according to the present invention.

DETAILED DESCRIPTION OF THE PREFERRED EMBODIMENTS

An improved electromagnetically controlled spring clutch mechanism according to the present invention will now be described in detail by way of embodiments with reference to the accompanying drawings.

In FIGS. 1 to 4, the electromagnetically controlled spring clutch mechanism according to this embodiment comprises a rotating output member 2, a rotating input member 4, an electromagnetic coil assembly 6, a coil spring 8, and an armature assembly 10.

The rotating output member 2 consists of a cylindrical axle portion 12, an output boss 14 having large diameter formed along the outer periphery of the central portion of the axle portion 12 in the axial direction, and an annular flange 16 provided at the end of the output boss 14 (see FIG. 2). A screw hole 18 extending in the radial direction is formed in the end of the axle portion 12. A notch 20 is formed in the outer peripheral portion of the annular flange 16. To use the clutch as shown by a two-dot chain line in FIG. 4, a rotating axle 22 which is to be controlled for its rotation is fitted to the axle portion 12, and a screw 24 is screwed into the screw hole 18 and into a corresponding screw hole (not shown) of the rotating axle 22, so that the rotating output member 2 is fixed to the rotating axle 22.

The rotating input member 4 consists of a gear 26 made of synthetic resin and a cylindrical metallic input boss 28 which are driven members. A pair of arcuate protrusions 30 extending in the axial direction are formed at a cylindrical end of the input boss 28. The gear 26 has formed at its center a hole 32 that is fitted to the axle portion 12, and further has arcuate recesses 34 formed in the inner peripheral portions of the hole to engage with the arcuate protrusions 30. The input boss 28 has an inner diameter of a size that fits to the axle portion 12. When the arcuate protrusions 30 of the input boss 28 are engaged with the arcuate recesses 34 of the gear 26, the input boss 28 is coupled to the gear 26 so that they will not rotate relative to each other when the cylindrical portion of the input boss 28 protrudes to the gear 26 in the axial direction. They may be formed as a unitary structure. The rotating input member 4 consisting of the gear 26 and the input boss 28 is rotatably supported at (fitted to) an end of the output boss 14 of the axle portion 12. Under this fitted state, the cylindrical portion of the output boss 14 of the axle portion 12 and that of the input boss 28 have substantially the same outer diameter. A snap ring 36 is fitted to an end of the axle portion 12 to prevent the rotating input member 4 from escaping.

The electromagnetic coil assembly 6 is rotatably supported by the axle portion 12 and spaced from the rotating input member 4 in the axial direction. The electromagnetic coil assembly 6 consists of a field iron core 38 that is rotatably supported at the other end of the output boss 14 of the axle portion 12, and a casing 42 that is secured to the field iron core 38 such that the electromagnetic coil 40 is held along the outer peripheral portion of the field iron core 38.

The field iron core 38 has a generally cylindrical shape, and further has a hole 44 that rotatably fits to the axle portion 12 and a cylindrical portion 46 which is open at one end in the axial direction. The field iron core 38 further has a stepped portion (shoulder) 48 of a small diameter formed at the other end of the outer diameter portion thereof in the axial direction.

The electromagnetic coil 40 is accommodated in a U-shaped space of a bobbin 50 which consists of a synthetic resin annular member having substantially a U-shape in cross section. Though not diagramed, the outer peripheral surface of the electromagnetic coil 40 is covered by a belt-like insulating member, and the connection terminal (cord) extends outwardly between the belt-like insulating member and one wall forming the U-shaped space of the bobbin 50. The bobbin 50 is fitted to the outer peripheral portion of the field iron core 38.

The casing 42 is made of a metal plate of a magnetic material, and constituted by a flat plate portion 54 having a hole 52 at the center and a pair of arcuate flange portions 56 formed by folding the opposing ends of the flat plate portion 54. The flat plate portion 54, continuous to the ends of the flange portions 56, has other opposing ends that are in parallel with each other. An engaging portion 58 formed by extending the flat plate portion 54 is provided at one of the other ends of the flat plate portion 54.

The casing 42 is fitted through the hole 52 to the stepped portion 48 of the field iron core 38, and is secured thereto by caulking. The pair of arcuate flange portions 56 of the casing 42 cover the outer peripheral surface of the electromagnetic coil 40 along the bobbin 50, and are caulked from the outside, such that the electromagnetic coil 40 is secured to the field iron core 38. The connection terminal of the electromagnetic coil 40 are led out to the external side through a gap between the ends of the pair of arcuate flange portions 56 in the circumferential direction. In the thus assembled state, the ends in the axial direction of the arcuate flange portions 56 of the casing 42 and the open end of the cylindrical portion 46 of the field iron core 38 are positioned on the same plane substantially at right angles with the axis of rotation, thereby to form one end of the electromagnetic coil assembly 6 in the axial direction. The ends in the axial direction of the arcuate flange portions 56 function as a rotor.

By rotatably fitting the hole 44 of the field iron core 38 to one end of the axle portion 12, the electromagnetic coil assembly 6 is supported by the axle portion 12. The bottom wall 47 of cylindrical portion 46 of the field iron core 38 abuts with the side portion of the annular flange 16 of the axle portion 12. A snap ring 59 is fixed, by pushing with a pressure, to the axle portion 12 at an outer end position of the field iron core 38, so that the field iron core 38 will not escape from the axle portion 12.

Space is formed between the outer peripheral portion of the output boss 14 including annular flange 16 of the axle portion 12 and the inner peripheral portion of the cylindrical portion 46 of the field iron core 38.

The armature assembly 10 consists of an armature 62 and a supporting member 64 that are coupled together via a spring member 60.

The supporting member 64 is made of a synthetic resin and has a cylindrical portion 66 and an annular flange 68 formed at one end thereof. Notches 70 are formed in the outer periphery of the annular flange 68 at a plurality of positions, i.e., at three positions maintaining an equal distance in the circumferential direction. Further, screw holes 72 are formed in the outer periphery of the annular flange 68 at a plurality of positions, i.e., at three positions maintaining an equal distance in the circumferential direction.

Referring to FIG. 3, at the other end of the cylindrical portion 66 is formed a hole 66b having a diameter greater than that of the inner diameter portion 66a, and a stepped portion 66c is formed therebetween. The inner diameter of the hole 66b is greater than the outer diameter of the annular flange 16 of the output boss 14, and the inner diameter of the inner diameter portion 66a is smaller than the outer diameter of the annular flange 16. The inner diameter portion 66a penetrates through the annular flange 68, an annular projection 68a is formed at an end of the annular flange 68, the annular projection 68a having a diameter smaller than that of the flange 68, and a notch (groove) 68b is formed in the annular flange 68 being outwardly directed in the radial direction. The annular projection 68a is provided in order to minimize the contact with the gear 26. On the inner diameter side of the annular projection 68a is formed an annular projection 68c which is smaller than the outer diameter of the coil spring 8. The annular projection 68c inhibits the rightward movement of the coil spring 8 in FIG. 4. Further, when an engaging portion 88 of the coil spring 8 is engaged with the notch 68b of the supporting member 64, the coil spring 8 is supported by the supporting member 64 owing to the annular projection 68c and the engaging portion 88, and does not escape. This is advantageous for assembling the mechanism.

The armature 62 is comprised of an annular magnetic member, and has three connecting holes 74 in the axial direction at positions corresponding to the notches 70 of the annular flange 68, and further has three notches 76 in the circumferential direction at positions corresponding to the screw holes 72. The spring member 60 is constituted by an annular plate spring having spring characteristics such as of a spring steel. The spring member 60 has three coupling holes 78 of the axial direction at positions corresponding to the notches 76 and the threaded holes 72, and has three connecting holes 80 in the axial direction at positions corresponding to the coupling holes 74 and the notches 70.

The armature 62 and the spring member 60 are fitted to the cylindrical portion 66 of the supporting member 64, and are secured by rivets 82 via the connecting holes 74 and 80 in the state that they are overlapped on the annular flange 68. The spring member 60 and the supporting member 64 are secured together by screws 84 via the connecting holes 78 and 72. The notches 76 and 70 give "freedom" for fastening by the screws 84 and rivets 82.

The coil spring 8 is fitted astride the outer peripheral portions of both the output boss 14 of the axle portion 12 and the input boss 28. The coil spring 8 in this case is comprised of a spring wire material having a rectangular shape in cross section. The spring wire is wound in the clockwise direction as viewed from the left side in FIG. 1 so as to proceed rightwardly. An engaging portion 86 protruding in the axial direction is formed at one end of the coil spring 8; and an engaging portion 88 is formed at the other end outwardly protruding in the radial direction. The engaging portion 86 engages with the notch 20 in the annular flange 16 of the output boss 14 and the engaging portion 88 engages with the notch 68b in the annular flange 68 of the support member 64. The coil spring 8 is "tight-fitted" to the output boss 14 and to the input boss 28 of the rotating input member 4. It is desired that the "tight-fit" is formed at least between the coil spring 8 and the input boss 28 of the rotating input member 4.

The armature assembly 10 is supported by the electromagnetic coil assembly 6 since the cylindrical portion 66 of the supporting member 64 is rotatably supported in the cylindrical portion 46 of the field iron core 38. Under this state, the outer diameter portion of the coil spring 8 is positioned in the inner diameter portion 66a of the cylindrical portion 66 of the supporting member 64. Therefore, the coil spring 8 and the cylindrical portion 66 of the supporting member 64 are so arranged as to be partly inserted in the cylindrical portion 46 of the field iron core 38. The armature 62 and the spring member 60 mounted on the annular flange 68 of the support member 64 are located between the electromagnetic coil assembly 6 and the rotating input member 4 or the gear 26.

As shown in FIG. 5, furthermore, a gap A is formed in the axial direction between the armature 62 and the electromagnetic coil assembly 6 (in this case, ends of the arcuate flange 56 of the casing 42 and the field iron core 38). Moreover, a gap B is formed in the axial direction between the stepped portion 66c of the supporting member 64 (FIG. 3) and the end of the annular flange 16 of the output boss 14. The gap A is greater than the gap B. Here, the gap B may be formed between the end of cylindrical portion 66 of the supporting member 64 and the bottom wall 47 in the cylindrical portion 46 of the field iron core 38.

Next, described below with reference to chiefly FIGS. 4 to 6 is the operation of the embodiment of the electromagnetically controlled spring clutch mechanism of the present invention constructed as described above.

When the electromagnetically controlled spring clutch mechanism is to be used, the rotating output member 2 assembled as shown in FIG. 4 is fixed by screw 24 to the rotating axle 22 so as to be supported by the rotating axle 22. The engaging portion 58 (two-dot chain line in FIG. 4) of casing 42 of the electromagnetic coil assembly 6 is inserted so as not to rotate in an engaging hole formed in the frame or the substrate plate (not shown) which supports the rotating axle 22. The gear 26 is coupled to a driving gear (not shown).

When the electromagnetic coil 40 is deenergized, as mentioned earlier, the gap A is formed between the electromagnetic coil assembly 6 and the armature 62, and the gap B is formed between the supporting member 64 and the annular flange 16 of the output boss 14 (see FIG. 5). As the gear 26 is rotated in the direction of arrow R in FIG. 1 by means of the driving gear (not shown), the input boss 28 is rotated in the same direction at the same time. Since the engaging portion 86 at an end of the coil spring 8 tight-fitted to the input boss 28 is engaged with the notch 20 of the annular flange 16 of the output boss 14, the coil spring 8 undergoes a rotational difference and is contracts in the tightening direction. The input boss 28 and the output boss 14 are drivingly coupled together by the coil spring 8, and the rotation of the gear 26 is transmitted to the rotating axle 22 via the axle portion 12. Here, the armature assembly 10 is rotated together therewith since the engaging portion 88 of the coil spring 8 is engaged with the notch 68b of the supporting member 64.

Next, when the electromagnetic coil 40 is energized under this driving condition, the armature 62 is attracted toward the electromagnetic coil assembly 6. The supporting member 64 moves in the axial direction and the stepped portion 66c thereof first comes in contact with the annular flange 16 of the output boss 14. There exists no gap B. The armature 62 is further attracted against the spring force of the spring member 60, and is finally attracted by the end of the annular flange 56 of the casing 42 and the field iron core 38. There exists no gap A (see FIG. 6). The coil spring 8 is not allowed to rotate. Due to the rotation of the input boss 28, therefore, the coil spring 8 is moved in a direction so that the inner diameter thereof expands, and the coil spring 8 is released from the contracted state. Consequently, the input boss 28 rotates without transmitting force to the coil spring 8 and the axle portion 12, and the input boss 28 and the output boss 14 are uncoupled.

Therefore, the rotation of the gear 26 is not transmitted to the axle portion 12 or the rotating axle 22.

When the electromagnetic coil 40 is deenergized, there exists a relationship A>B between the gap B and the gap A. Therefore, the armature 62 that is rotating is prevented from coming in contact with the ends of the arcuate flange 56 of the casing 42 and the field iron core 38.

According to the present invention described in the foregoing by way of an embodiment, there are obtained the following effects.

(1) When the rotational driving force of the rotating input member is transmitted to the axle portion, the coil spring contracts in the tightening direction, and the output boss and the input boss of the rotating input member are drivingly-coupled together to rotate as a unitary structure without at all developing dragging torque unlike a conventional device. Therefore, loss in driving force is eliminated and the constituent parts are not undesirably worn out so that the durability is improved and the life is extended.

(2) The coil spring and the supporting member of the armature assembly are partly inserted in the cylindrical portion of the field iron core, making it possible to greatly reduce the space in the axial direction and enabling the mechanism to be realized in a very compact size as a whole.

(3) When the present invention is constituted as described by way of the embodiment, the spring clutch is obtained with a reduced number of parts and its structure is efficiently assembled contributing to decreasing the manufacturing cost.

(4) When the coil spring is tight-fitted to at least the input boss of the rotating input member, quick response is obtained in the transmission of driving force.

The present invention has been described herein above in detail by way of the embodiment, but it should be noted that the invention is in no way limited to the above-mentioned embodiment only, and can be changed or modified in a variety of other ways within the scope of the invention.

I claim:

1. An electromagnetically controlled spring clutch mechanism comprising:
   a rotating output member having an output boss;
   a rotating input member having an input boss which is rotatably supported by the rotating output member and spaced therefrom in an axial direction;
   an electromagnetic coil assembly including an electromagnetic coil;
   a coil spring which is fitted astride outer peripheral portions of both the output boss and the input boss; and
   an armature assembly disposed along an outer peripheral portion of the coil spring;
   the armature assembly comprising an armature and a supporting member that are coupled together by a spring member, one end of the coil spring being engaged with the output boss and its other end being at the supporting member, when the electromagnetic coil is deenergized, the coil spring contracts in a tightening direction by rotation of the input boss of the rotating input member and the output boss and the input boss are drivingly coupled together, when the electromagnetic coil is energized, the armature is magnetically attracted to the electromagnetic coil assembly, rotation of the armature assembly is blocked, the coil spring expands, and the output boss and the input boss are uncoupled.

2. The electromagnetically controlled spring clutch mechanism according to claim 1, wherein said electromagnetic coil assembly consists of a field iron core that is rotatably supported by said rotating output member and a casing that is secured to the field iron core so that said electromagnetic coil is held by an outer peripheral portion of the field iron core, and said field iron core has a cylindrical portion that is open at an end thereof in the axial direction, said supporting member of said armature assembly being rotatably supported in said cylindrical portion, and said coil spring being disposed inside said supporting member.

3. The electromagnetically controlled spring clutch mechanism according to claim 1, wherein said supporting member of said armature assembly consists of a cylindrical portion and an annular flange portion formed at an end of said cylindrical portion, said spring member and said armature are made of annular members, respectively, and are disposed on said cylindrical portion of said supporting member, said spring member being couplable to said annular flange portion at a plurality of positions which are located at a distance in a circumferential direction, and said armature is couplable to said spring member at a plurality of other positions which are located at a distance in the circumferential direction.

4. The electromagnetically controlled spring clutch mechanism according to claim 3, wherein said annular flange portion of said supporting member, said armature provided on said annular flange portion and said spring member are disposed at intervals between said electromagnetic coil assembly and said rotating input member, and when said electromagnetic coil is deenergized, gaps are formed between said armature and said electromagnetic coil assembly and between an end of said cylindrical portion of said supporting member and said field iron core or said rotating output member in the axial direction, respectively, the gap between said armature and said electromagnetic coil assembly being greater than the gap between an end of said cylindrical portion of said supporting member and said field iron core or said rotating output member.

5. The electromagnetically controlled spring clutch mechanism according to claim 1, wherein at least said coil spring and said input boss of said rotating input member are assembled together by tight-fitting.

6. The electromagnetically controlled spring clutch mechanism according to claim 1, wherein said rotating input member consists of a driving member and said input boss, and said input boss is engaged with the driving member inhibiting the rotation relative to each other.

* * * * *